(12) United States Patent
Corsmeier

(10) Patent No.: US 7,475,532 B2
(45) Date of Patent: Jan. 13, 2009

(54) VALVE ASSEMBLY FOR A GAS TURBINE ENGINE

(75) Inventor: Donald Michael Corsmeier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 595 days.

(21) Appl. No.: 11/214,108

(22) Filed: Aug. 29, 2005

(65) Prior Publication Data
US 2007/0234736 A1    Oct. 11, 2007

(51) Int. Cl.
F02K 3/02 (2006.01)
F02K 3/10 (2006.01)
(52) U.S. Cl. ............................ 60/226.3; 60/762
(58) Field of Classification Search ............. 60/226.1, 60/226.3, 266, 761, 762, 766
See application file for complete search history.

(56) References Cited

U.S. PATENT DOCUMENTS

| 4,175,384 | A |   | 11/1979 | Wagenknecht et al. |
| 5,307,624 | A | * | 5/1994 | Even-Nur et al. ............ 60/226.3 |
| 5,343,697 | A |   | 9/1994 | Johnson et al. |
| 5,694,767 | A | * | 12/1997 | Vdoviak et al. ............. 60/226.3 |
| 5,899,058 | A | * | 5/1999 | Narcus et al. ............... 60/226.3 |

* cited by examiner

Primary Examiner—Louis J Casaregola
(74) Attorney, Agent, or Firm—William Scott Andes, Esq.; Armstrong Teasdale LLP

(57) ABSTRACT

A method for channeling compressed air to a gas turbine engine augmentor is provided. The method includes coupling an annular slide valve to a gas turbine engine separation liner, coupling a valve seat to a gas turbine engine diffuser such that an airflow passage is defined between the annular slide valve and the valve seat, and channeling compressed air to the annular slide valve to facilitate regulating the quantity of fan bypass air channeled to the gas turbine engine augmentor.

14 Claims, 4 Drawing Sheets

VALVE ASSEMBLY FOR A GAS TURBINE ENGINE

STATEMENT REGARDING FEDERALLY SPONSORED RESEARCH & DEVELOPMENT

The U.S. Government may have certain rights in this invention pursuant to contract number N00019-96-C-0176.

BACKGROUND OF THE INVENTION

This invention relates generally to gas turbine engines and, more particularly, to a valve assembly for gas turbine engines.

At least some known aircraft gas turbine engines include a fan, a compressor, a combustor, a high pressure turbine, a low pressure turbine and an augmentor or "afterburner". Airflow entering the fan is compressed. Airflow exiting the fan is split where a portion is directed into the compressor and the remaining portion, referred to as fan bypass flow, is directed into a bypass passage where it bypasses the compressor, the combustor, the high pressure turbine and the low pressure turbine. Airflow entering the compressor is compressed and directed to the combustor where it is mixed with fuel and ignited, producing hot combustion gases used to drive both the high pressure and the low pressure turbines. Moreover, at least some known gas turbine engines, combine, in the augmentor, a portion of the fan bypass flow with the airflow exiting the low pressure turbine. Furthermore, at least some gas turbine engines include a valve assembly that is configured to regulate at least a portion of the fan bypass air entering the augmentor. However, known valve assemblies include crank-arms that are driven by hydraulic actuators. Accordingly, such valve assemblies are relatively complex to design and add additional cost and additional weight to the aircraft thus reducing the fuel efficiency of the aircraft.

BRIEF DESCRIPTION OF THE INVENTION

In one aspect, a method for channeling compressed air to a gas turbine engine augmentor is provided. The method includes coupling an annular slide valve to a gas turbine engine separation liner, coupling a valve seat to a gas turbine engine diffuser such that an airflow passage is defined between the annular slide valve and the valve seat, and channeling compressed air to the annular slide valve to facilitate regulating the quantity of fan bypass air channeled to the gas turbine engine augmentor.

In another aspect, an annular slide valve assembly for a gas turbine engine is provided. The annular slide valve assembly includes an annular slide valve coupled to a gas turbine engine separation liner, a valve seat coupled to a gas turbine engine diffuser such that an airflow passage is defined between the annular slide valve and the valve seat, and a control valve coupled to the annular slide valve, the control valve is configured to channel compressed air to the annular slide valve to facilitate regulating the quantity of fan bypass air channeled to the gas turbine engine augmentor.

In a further aspect, a gas turbine engine is provided. The gas turbine engine includes a fan, a compressor, a turbine coupled in flow communication with the compressor, an outer casing circumscribing the turbine, an augmentor in flow communication with the fan, and an annular slide valve assembly configured to channel fan bypass air to the augmentor. The annular slide valve assembly includes an annular slide valve, a valve seat positioned such that an airflow passage is defined between the annular slide valve and the valve seat, and a control valve coupled to the annular slide valve, the control valve configured to channel compressed air to the annular slide valve to facilitate regulating the quantity of fan bypass air channeled to the gas turbine engine augmentor.

DETAILED DESCRIPTION OF THE INVENTION

Figure 1:
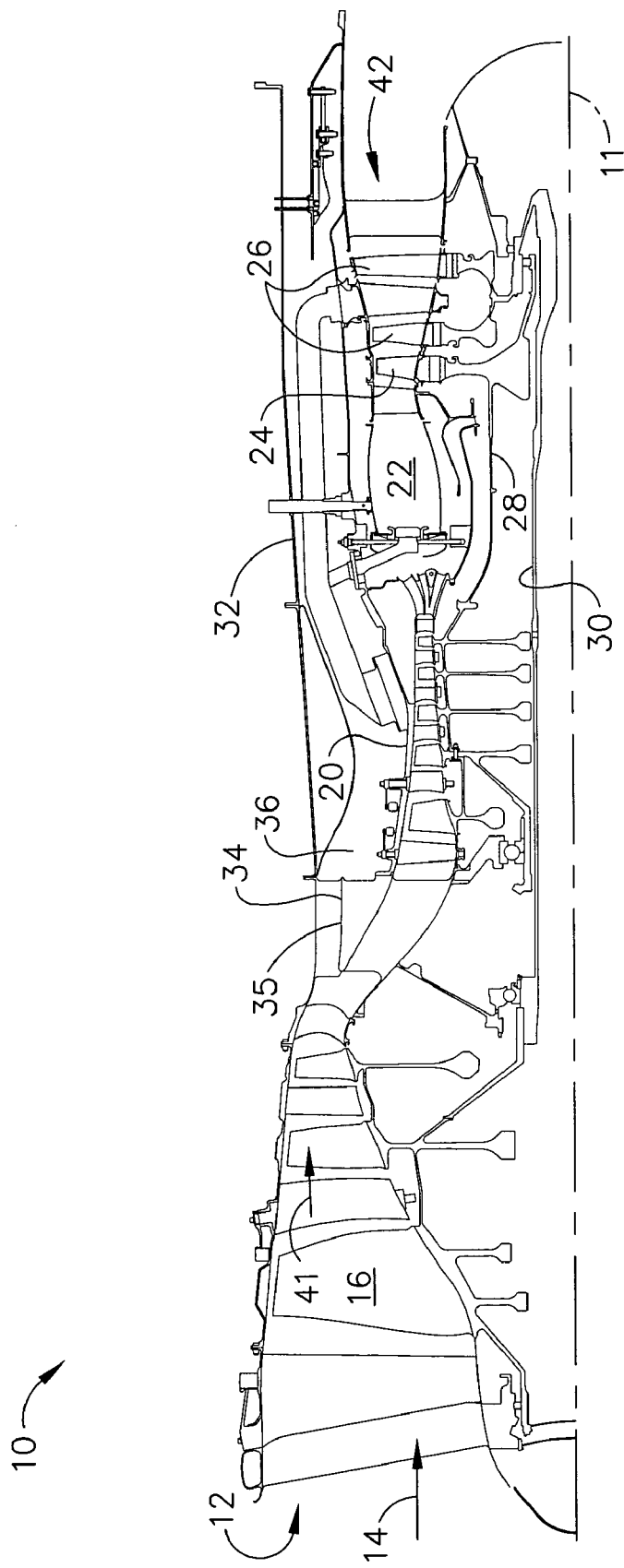
FIG. 1 is a schematic illustration of an exemplary variable cycle gas turbine engine.
Figure 2:
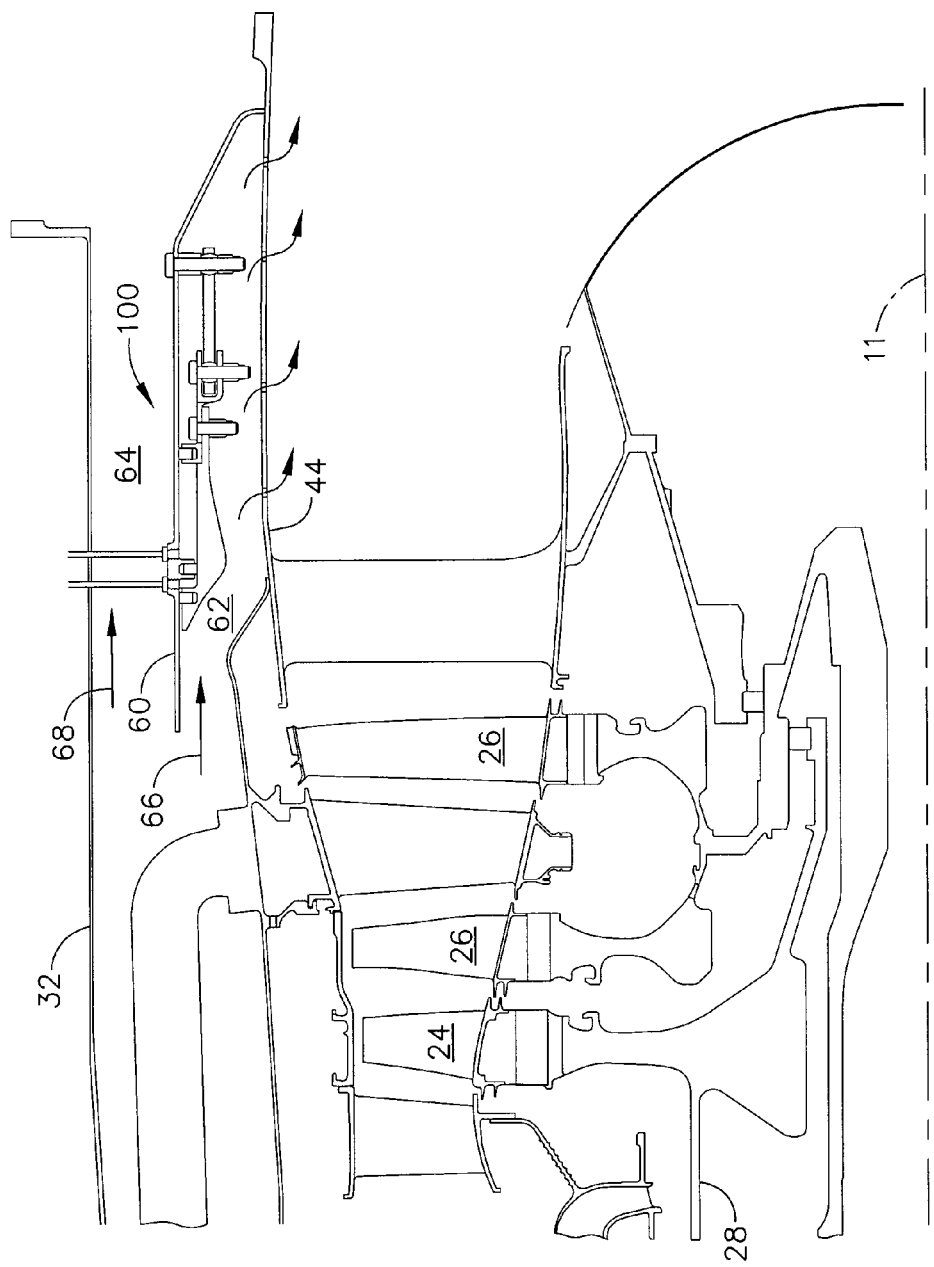
FIG. 2 is an enlarged schematic illustration of a portion of the exemplary variable cycle gas turbine engine shown in FIG. 1.

FIG. 1 is a schematic illustration of an exemplary variable cycle gas turbine engine 10 having a longitudinal centerline 11. FIG. 2 is an enlarged view of gas turbine engine 10 (shown in FIG. 1). Gas turbine engine 10 includes an annular inlet 12 for receiving ambient air 14 followed in axial flow relationship by a fan assembly 16, a high pressure compressor (HPC) 20, a combustor 22, a high pressure turbine (HPT) 24, a low pressure turbine (LPT) 26 and an augmentor 42. The HPT 24 powers the HPC 20 through a first shaft 28. LPT 26 powers the fan assembly 16 by a second shaft 30. Engine 10 further includes an outer casing 32 which is spaced from an inner casing 34, including a forward section 35 of the inner casing defining a bypass duct 36. In the exemplary embodiment, augmentor 42 includes a diffuser 44.

In the exemplary embodiment, gas turbine engine 10 also includes a separation liner 60 that is positioned within bypass duct 36. More specifically, separation liner 60 is positioned within bypass duct 36 such that bypass duct 36 is separated into a first bypass duct 62 and a second bypass duct 64 that is radially outward from first bypass duct 62. Accordingly, and in the exemplary embodiment, fan bypass air 41 entering bypass duct 36 is divided into a first air flow stream 66 and a second airflow stream 68. Gas turbine engine 10 also includes a valve assembly 100 to facilitate regulating the volume of first air flow stream 66 that is channeled through first bypass duct 62.

Figure 3:
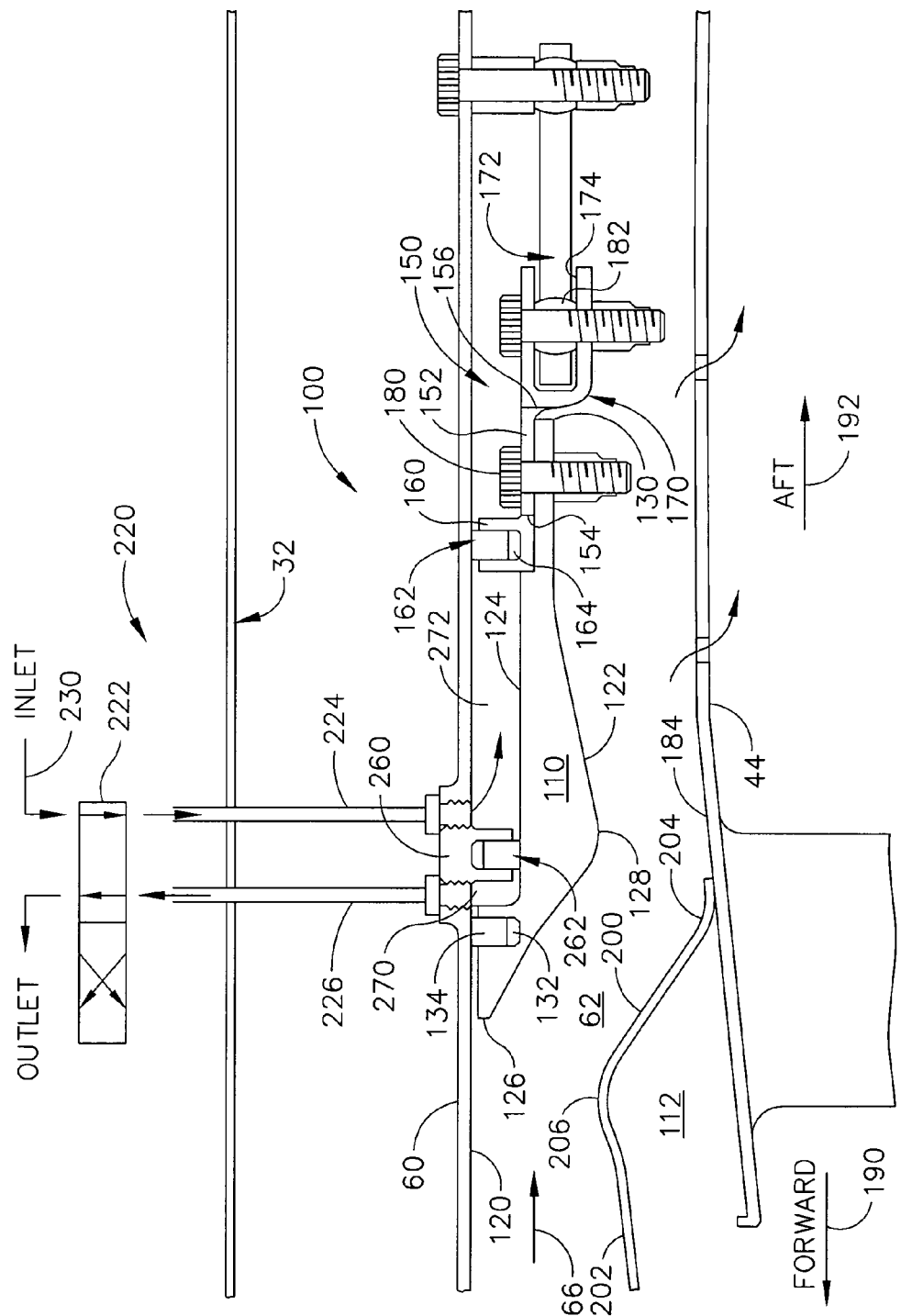
FIG. 3 is a schematic illustration of an exemplary valve assembly in a first operational configuration that may be used with the gas turbine engine shown in FIG. 1.
Figure 4:
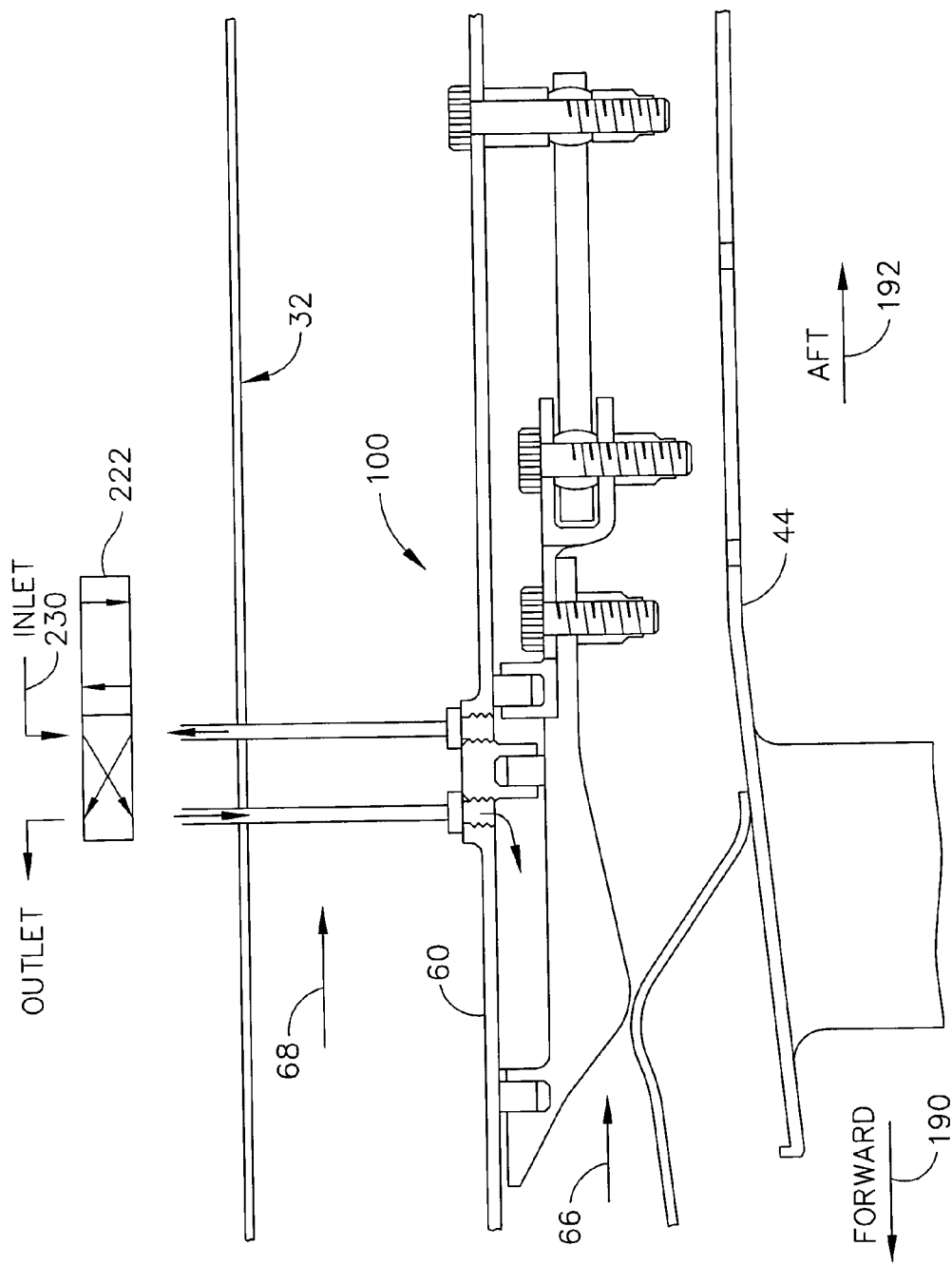
FIG. 4 is a schematic illustration of the valve assembly, shown in FIG. 3, in a second operational configuration.

FIG. 3 is a schematic illustration of exemplary valve assembly 100 in a first operational configuration that may be used with gas turbine engine 10 (shown in FIG. 1). FIG. 4 is a schematic illustration of valve assembly 100 in a second operational configuration. Although valve assembly 100 is shown coupled to exemplary engine 10 it should be realized that valve assembly 100 may also be coupled to a wide variety of gas turbines without limiting the scope of the invention described herein.

In the exemplary embodiment, slide valve assembly 100 includes an annular slide valve 110 that is slidably coupled to separation liner 60 and an annular valve seat 112 that is coupled to diffuser 44. In the exemplary embodiment, valve seat 112 is coupled to diffuser 44, using a brazing or a welding procedure, for example. In an alternative embodiment, valve seat 112 is coupled to diffuser 44, using a plurality of mechanical fasteners.

In the exemplary embodiment, slide valve 110 extends radially inwardly from and circumferentially around a radially inner surface 120 of separation liner 60. More specifically, slide valve 110 is substantially annular and extends around an inner periphery of separation liner 60 such that slide valve 110 substantially inscribes separation liner 60. Slide valve 110 includes a radially inner surface 122 and a radially outer surface 124. In the exemplary embodiment, radially inner surface 122 gradually tapers from a first end 126 to an apex 128 and gradually tapers from apex 128 to a second end 130. Slide valve 110 includes a least one channel 132 that is formed in radially outer surface 124 and a seal 134 that is positioned at least partially within channel 132 to facilitate forming a sealing contact between slide valve 110 and separation liner 60. In the exemplary embodiment, seal 134 is fabricated from a material such as, but not limited to an elastomeric composite.

Valve assembly 100 also includes an aft seal housing 150 that is coupled to slide valve second end 130. More specifically, seal housing 150 is substantially annular and extends around an inner periphery of separation liner 60 such that aft seal housing 150 substantially inscribes separation liner 60. Aft seal housing 150 includes a body portion 152 having a first end 154 and a second end 156.

In the exemplary embodiment, aft seal housing 150 also includes a packing casing 160 and a seal 162 that is received in a channel 164 that is formed in packing casing 160. In the exemplary embodiment, channel 164 has a substantially C-shaped cross-sectional profile that extends radially into packing casing 160 and around an outer circumference of packing casing 160, such that packing casing 160 faces radially outwardly. In the exemplary embodiment, seal 162 is fabricated from a material such as, but not limited to an elastomeric composite.

Aft seal housing 150 also includes a housing 170 and a plurality of exhaust nozzle follower links 172 that are received in a channel 174 formed in housing 170. In the exemplary embodiment, channel 174 has a substantially C-shaped cross-sectional profile channel that extends radially into housing 170 such that channel 174 faces axially aft. In the exemplary embodiment, body portion 152, packing casing 160, and housing 170 are fabricated together to form aft seal housing 150 which is then coupled to slide valve 110 using a plurality of fasteners 180, for example. In an alternative embodiment, aft seal housing 150 is coupled to slide valve 110 through a brazing and/or welding procedure, for example. In another alternative embodiment, slide valve 110 and aft seal housing 150 are fabricated together unitarily.

In the exemplary embodiment, exhaust nozzle follower links 172 are pivotally coupled to separation liner 60, and aft seal assembly 150 is pivotally coupled to exhaust nozzle follower links 172 using a plurality of bearings 182, for example. Exhaust nozzle follower links 172, commonly referred to as a "dog bone link", are links with spherical type bearings, "uni-balls", at either end. More specifically, slide valve 110 is pivotally coupled to exhaust nozzle follower links 172 via aft seal assembly 150, such that slide valve 110 is operable in a first direction 190 and/or a second direction 192, wherein first and second directions 190 and 192 are approximately parallel to longitudinal centerline 11 (shown in FIG. 1). Accordingly, during operation, slide valve 110 is translatable in a forward and/or aft direction along longitudinal centerline 11.

In the exemplary embodiment, valve seat 112 extends radially outward from and circumferentially around an exterior surface 184 of diffuser 44. More specifically, valve seat 112 is substantially annular and extends around an outer periphery of diffuser 44 such that valve seat 112 substantially circumscribes diffuser 44. Valve seat 112 includes a radially outer surface 200 that extends from a first end 202 to a second end 204. In the exemplary embodiment, outer surface 200 gradually tapers from first end 202 to an apex 206 and is substantially linear from apex 206 to second end 204. More specifically, slide valve 110 is configured to operational engage with valve seat portion 112 to facilitate regulating the volume of first air flow stream 66 that is channeled through first bypass duct 62.

Slide valve assembly 100 also includes an actuation system 220. In the exemplary embodiment, actuation system 220 includes a control or actuating valve 222, a supply manifold 224, and a vent manifold 226. In the exemplary embodiment, control valve 222 is an actuated two position multiple flow path valve that is configured to reposition slide valve 110 from a first position (shown in FIG. 4) wherein valve assembly 100 is substantially closed to a second position (shown in FIG. 3) wherein valve assembly 100 is substantially open.

More specifically, control valve 222 includes an air supply inlet 230 that is coupled to an air supply source, such as, but not limited to, compressor 20 such that air discharged from compressor 20 is channeled to inlet 230. In an alternative embodiment, inlet 230 is coupled to an external air supply source, such as, but not limited to, an air compressor. More specifically, separation liner 60 includes a seal housing 260 and a seal 262 that is positioned at least partially within seal housing 260 such that a sealing contact is formed between seal 262 and slide valve radially outer surface 124. Accordingly, seal 262 facilitates forming a first cavity 270 that is defined between seal 262, seal 134, separation liner radially inner surface 120, and slide valve radially outer surface 124, and a second cavity 272 that is defined between seal 262, seal 162, separation liner radially inner surface 120, and slide valve radially outer surface 124.

During operation, and referring to FIG. 3, to facilitate translating slide valve 110 in aft direction 192, i.e. to an open position, compressed air is channeled through inlet 230, through supply manifold 224 and into a cavity 272. The compressed air within cavity 272 reacts against seal 262 and seal 162 thus moving slide valve 100 in aft direction 192. Alternatively, as shown in FIG. 4, compressed air is channeled through inlet 230, through manifold 226 and into a cavity 270. The compressed air within cavity 270 reacts against seal 262 and seal 134 thus moving slide valve 100 in forward direction 190.

Exemplary embodiments of an annular slide valve assembly are described above in detail. Specifically, the gas turbine engine includes an annular slide valve assembly that is axially forward of the augmentor such that when the fan bypass air is separated into two separate air streams, the inner fan bypass airstream is controlled by the fore-aft motion of the annular slide valve. For example, during STOVL (Short Take-off and Vertical Landing) mode, the valve assembly remains in the closed position such that an decreased quantity of air is channeled to the augmentor, thereby permitting the air not entering the augmentor to be used for STOVL purposes whereas during normal flight, the valve assembly is positioned in the open position to facilitate increasing the quantity of air channeled to the augmentor thereby increasing forward thrust. Accordingly, the valve assembly described herein, in the exemplary embodiment, is a two-position valve, that is either: fully aft to maximum open flow area or fully forward to minimum flow area. In an alternative embodiment, the annular slide valve is a regulating valve that can be positioned in a plurality of positions to facilitate regulating the quantity of bypassed air. Moreover, utilizing a pneumatic valve assembly facilitates reducing the weight of the aircraft by eliminating at least one known hydraulic actuator driven system.

Exemplary embodiments of an annular slide valve assembly are described above in detail. The slide valve assembly is not limited to the specific embodiments described herein, but rather, components of the slide valve assembly may be utilized independently and separately from other components described herein. For example, the slide valve assembly may be utilized on any gas turbine engine or in combination with other valve assemblies on the gas turbine engine.

While the invention has been described in terms of various specific embodiments, those skilled in the art will recognize that the invention can be practiced with modification within the spirit and scope of the claims.

What is claimed is:

1. An annular slide valve assembly for a gas turbine engine, said annular slide valve assembly comprising:
    an annular slide valve located downstream from an inlet of a bypass duct of the engine, said annular slide valve coupled to a gas turbine engine separation liner;
    a valve seat coupled to a gas turbine engine augmentor such that an airflow passage is defined between said annular slide valve and said valve seat; and
    an actuated control valve coupled to said annular slide valve via an inlet manifold, said control valve configured to channel compressed air to said annular slide valve through said inlet manifold to facilitate regulating a flow of bypass air from the inlet of the bypass duct to said gas turbine engine augmentor.

2. An annular slide valve assembly in accordance with claim 1 further comprising:
    a first sealing member coupled between said annular slide valve and said gas turbine engine separation liner;
    a second sealing member coupled between said annular slide valve and said gas turbine engine separation liner such that a first cavity is defined between said annular slide valve and said gas turbine engine separation liner; and
    a third sealing member coupled between said annular slide valve and said gas turbine engine separation liner such that a second cavity is defined between said annular slide valve and said gas turbine engine separation liner.

3. An annular slide valve assembly in accordance with claim 2 wherein said control valve is configured to channel compressed air into at least one of the said first and second cavities to facilitate moving said annular slide valve in at least one of an axially forward and an axially aft direction.

4. An annular slide valve assembly in accordance with claim 2 further comprising an aft seal housing coupled to said annular slide valve, said third sealing member positioned at least partially within said aft seal housing such that a seal is formed between said annular slide valve and said gas turbine engine separation liner.

5. An annular slide valve assembly in accordance with claim 4 further comprising at least one follower link coupled between said aft seal housing and said gas turbine engine separation liner to facilitate moving said annular slide valve in at least one of a forward and aft direction.

6. An annular slide valve assembly in accordance with claim 4 wherein said aft seal housing comprises:
    a body portion;
    a packing casing coupled to said body portion, said packing easing having a substantially U-shaped cross-sectional profile that is configured to receive said third scaling member; and
    a housing coupled to said body portion, said housing having a substantially U-shaped cross-sectional profile, and at least one follower link positioned at least partially within said housing.

7. A gas turbine engine comprising:
    a compressor;
    a bypass duct in flow communication with said compressor;
    a turbine coupled in flow communication with said compressor;
    an outer easing circumscribing said compressor and said turbine;
    an augmentor in flow communication with said compressor; and
    an annular slide valve assembly configured to channel compressed air from said compressor to said augmentor, said annular slide valve assembly comprising:
    an annular slide valve located downstream from an inlet of said bypass duct of the engine;
    a valve seat positioned such that an airflow passage is defined between said annular slide valve and said valve seat; and
    a control valve coupled to said annular slide valve via an inlet manifold, said control valve configured to channel compressed air to said annular slide valve through said inlet manifold to facilitate regulating a flow of bypass air from the inlet of said bypass duct to said gas turbine engine augmentor.

8. A gas turbine engine in accordance with claim 7 further comprising:
    an outer casing circumscribing said compressor and said turbine;
    a diffuser coupled radially inward of said outer casing, said valve seat coupled to said diffuser; and
    a separation liner coupled between said outer casing and said diffuser, said annular slide valve coupled to said separation liner.

9. A gas turbine engine in accordance with claim 8 wherein said annular slide valve assembly further comprises:
    a first sealing member coupled between said annular slide valve and said separation liner;
    a second sealing member coupled between said annular slide valve and said separation liner such that a first cavity is defined between said annular slide valve and said separation liner; and
    a third sealing member coupled between said annular slide valve and said separation liner such that a second cavity is defined between said annular slide valve and said separation liner.

10. A gas turbine engine in accordance with claim 9 wherein said control valve is configured to channel compressed air into at least one of the said first and second cavities to facilitate moving said annular slide valve in at least one of an axially forward and an axially aft direction.

11. A gas turbine engine in accordance with claim 9 wherein said annular slide valve assembly further comprises an aft seal housing coupled to said annular slide valve, said third sealing member positioned at least partially within said aft seal housing such that a seal is formed between said annular slide valve and said separation liner.

12. A gas turbine engine in accordance with claim 11 wherein said annular slide valve assembly further comprises at least one follower link coupled between said aft seal housing and said separation liner to facilitate moving said annular slide valve in at least one of a forward and aft direction.

13. A gas turbine engine in accordance with claim 11 wherein said aft seal housing comprises:
 a body portion;
 a packing casing coupled to said body portion, said packing casing having a substantially U-shaped cross-sectional profile that is configured to receive said third sealing member; and
 a housing coupled to said body portion, said housing having a substantially U-shaped cross-sectional profile that is configured to receive an end of at least one follower link.

14. A gas turbine engine in accordance with claim 7 wherein said compressor is configured to channel compressed air to said control valve to facilitate moving said annular slide valve in at least one of an axially forward and an axially aft direction.

* * * * *